Aug. 17, 1965  F. G. HEIMANN  3,201,077
RETRACTABLE MEAT HOOK
Filed Aug. 21, 1963  2 Sheets-Sheet 2

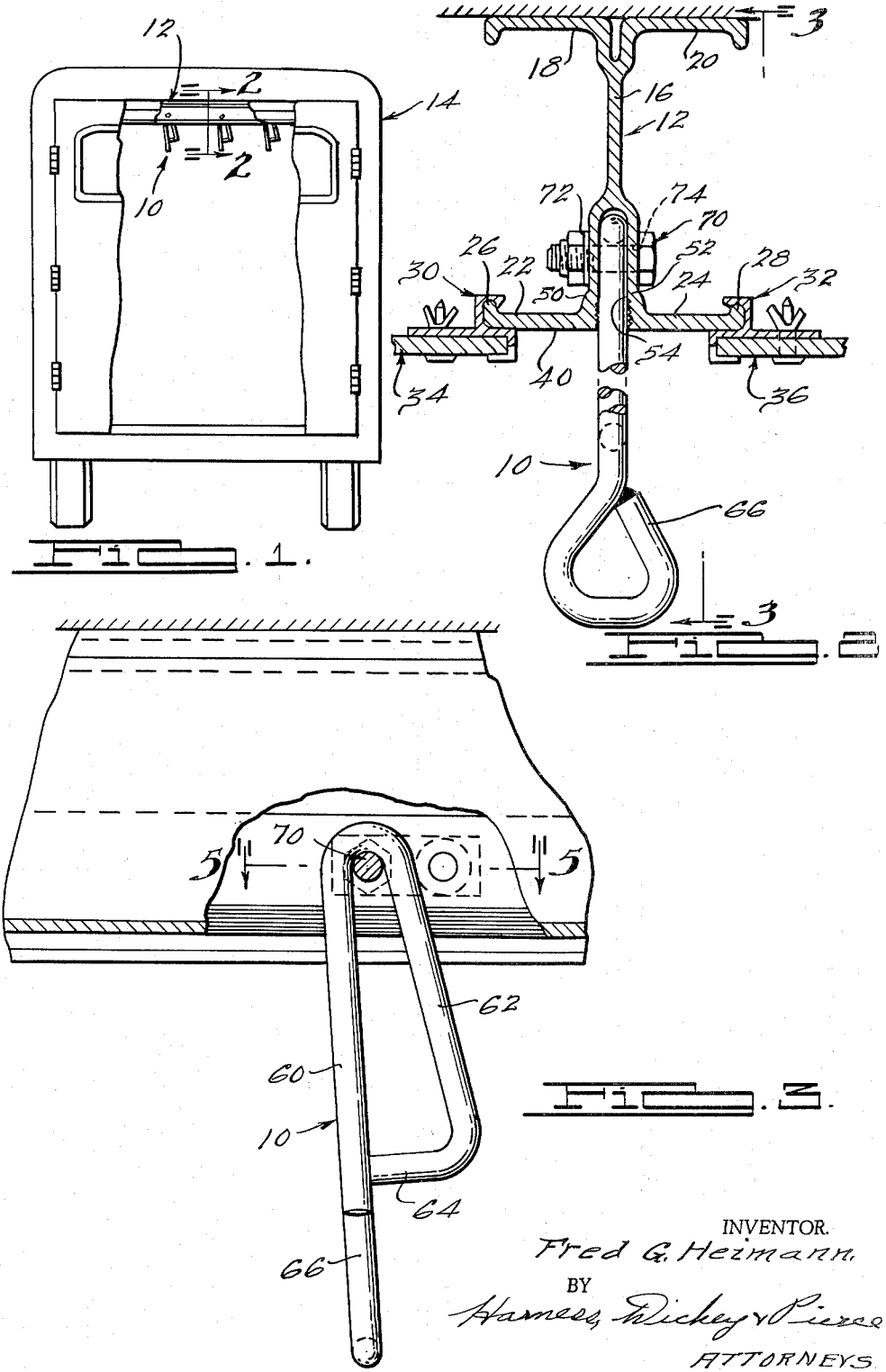

INVENTOR.
Fred G. Heimann.
BY
Harness, Dickey & Pierce
ATTORNEYS.

United States Patent Office 3,201,077
Patented Aug. 17, 1965

3,201,077
RETRACTABLE MEAT HOOK
Fred G. Heimann, Mount Clemens, Mich., assignor to
Fruehauf Corporation, a corporation of Michigan
Filed Aug. 21, 1963, Ser. No. 303,493
4 Claims. (Cl. 248—340)

This application relates generally to apparatus for transporting meat and the like and more particularly to a novel retractable meat hook for trucks, trailers and the like.

Refrigerated trucks and trailers used to transport meat and other perishable commodities are relatively expensive and therefore must be designed for maximum utilization. When such vehicles are used for the transport of, for example, sides of beef, suitable hooks must be provided in the ceiling of the truck or trailer for the suspension of the meat. Alternatively, when such vehicles are used for the transport of, for example, vegetables or other perishable goods that are shipped in crates which repose on the floor of the vehicle, it is desirable for the hooks to be retracted to enlarge the useable cubic volume of the vehicle.

This problem is solved in accordance with the instant invention by a novel meat hook that can be moved between a downwardly depending condition for the support of, for example, sides of beef and a retracted storage condition wherein it is locked substantially entirely out of the normal cube of the trailer thus allowing maximum utilization thereof.

The hook of the instant invention, when in the normal downwardly depending condition for the support of suspended loads, is pivotally supported to avoid transfer of moment loads to the roof cross beams. However, when the hook is moved to the stowed condition the point of support thereof is so located that the weight of the hook maintains the hook in the stowed condition. In addition, means are provided to avoid clattering of the hook within its supporting structure when in the stowed condition. Resilient means can also be provided to prevent the stowed hook from shifting due to vibration, etc.

Accordingly, one object of the instant invention is a retractable meat hook.

Another object is a folding meat hook that maximizes the useable cube of a truck, trailer or the like.

Another object is a folding meat hook that is retained in the stowed condition by its own weight.

Another object is a folding meat hook that is movable between a stowed condition and a downwardly depending operative condition.

Other objects and advantages of the instant invention will be apparent in the following specification, claims and drawings, wherein:

FIGURE 1 is a rear view of a highway vehicle partially broken away to show the meat hooks of the instant invention;

FIGURE 2 is a cross sectional view taken substantially along the line 2—2 of FIGURE 1;

FIGURE 3 is a view taken substantially along the line 3—3 of FIGURE 2;

Figure 4:
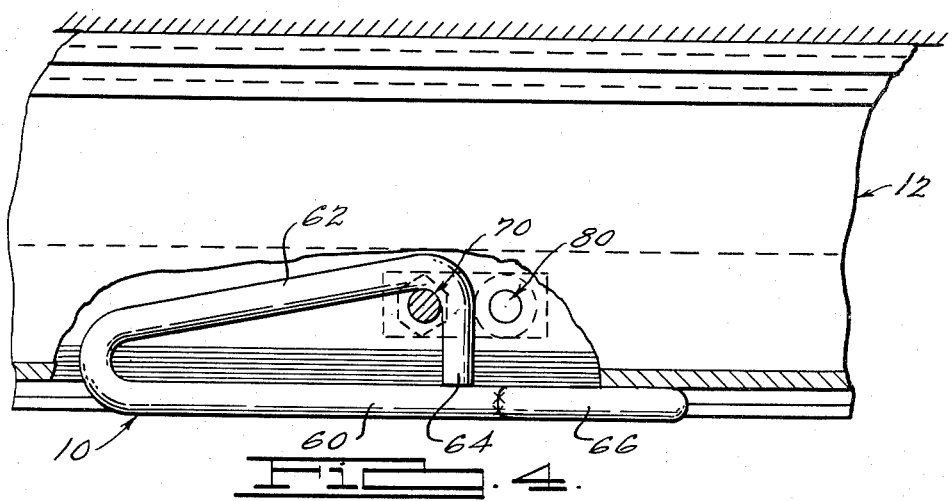
FIGURE 4 is a view similar to FIGURE 3 with the hook moved to the stowed condition.

A plurality of retractable meat hooks 10, in accordance with an exemplary constructed embodiment of the instant invention, are mounted in laterally spaced relationship on the cross members 12 of, for example, a refrigerated truck 14. It is a general practice to provide a plurality of cross members 12 in longitudinally spaced relationship within the trailer 14 at the upper wall or ceiling of the refrigerated enclosure.

As best seen in FIGURE 2 of the drawings, each cross beam 12 is of generally I-shaped vertical cross section defined by a vertical web portion 16, a pair of spaced oppositely directed horizontal upper flange portions 18 and 20, and a pair of spaced lower flange portions 22 and 24. The flange portions 22 and 24 have beaded edge portions 26 and 28, respectively, for the acceptance of complementary roof board retainers 30 and 32 which in turn support spaced roof boards 34 and 36, respectively.

It is to be noted that the retainer extrusions 30 and 32 support the roof boards 34 and 36 in downwardly spaced relation to the flanges 22 and 24 on the cross beam 12 thereby defining a recess 40 between adjacent roof boards 34 and 36 that is utilized as will be discussed.

In accordance with the instant invention the web portion 16 of the cross beam 12 is split into a pair of downwardly extending spaced legs 50 and 52 having a channel 54 therebetween for the acceptance of a plurality of the meat hooks 10. Because the meat hooks 10 are of like construction only one meat hook 10 will be discussed in detail it being understood that any number of meat hooks 10 can be provided in accordane with application requirements.

As best seen in FIGURE 3 of the drawings, each meat hook 10 is provided with a relatively straight shank portion 60 having a reentrantly folded upper end portion 62 with a terminal end portion 64 thereon that abuts the shank 60 in generally normal relationship. A lower end portion 66 of the hook 10 is reentrantly folded to define a closed hook for the acceptance of, for example, sides of beef in hanging relation.

The hook 10 is retained between the legs 50 and 52 of the web portion 16 of the cross beam 12 by a bolt 70 that extends through complementary apertures 72 and 74 in the leg portions 50 and 52, respectively.

As best seen in FIGURE 4 of the drawings, the hook 10 is movable to a generally horizontal stowed condition by sliding the reentrantly folded portion 62 thereof along the bolt 70 until the bolt 70 is positioned against the terminal end portion 64 thereof. When the hook 10 is in the stowed condition the shank portion 60 and hook portion 66 thereof are positioned within the recess 40 between the roof channels 34 and 36 thereby rendering the entire cube of the vehicle useable for the transportation of goods not required to be suspended from the hooks 10.

Figure 5:
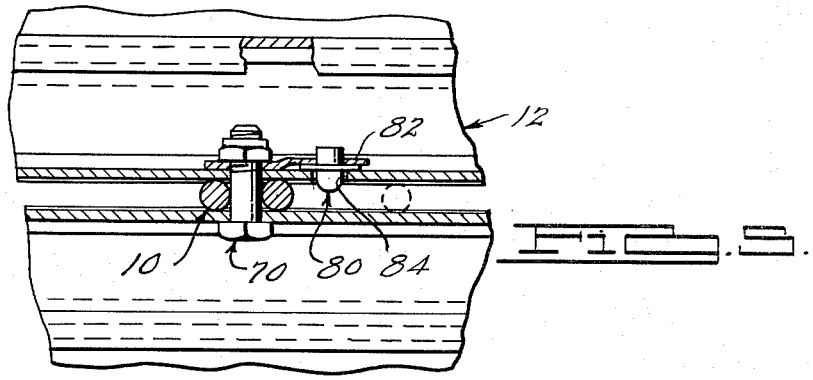
FIGURE 5 is a view taken substantially along the line 5—5 of FIGURE 3.

As best seen in FIGURE 5 the hook may be locked in the stowed condition by a spring loaded detent 80 that is mounted on a resilient leaf spring 82 and extends through a complementary aperture 84 in the leg 52 of the cross beam 12. The spring 82 is retained by the bolt 70. When the hook 10 is in the stowed condition the detent 80 precludes movement thereof laterally along the cross member 12 which movement is necessary to swing the hook 10 to the downwardly depending condition. When it is desired to lower the hook 10 it is, of course, relatively easy to overcome the spring bias of the detent 80.

It is also to be noted that the structural configuration of the hook 10 is such that the center of gravity thereof tends to preclude rotation of the hook 10 about the pin 70 when the hook 10 is in the stowed condition. Thus, the hook 10 is inherently self-stabilizing.

Figures 6, 7:
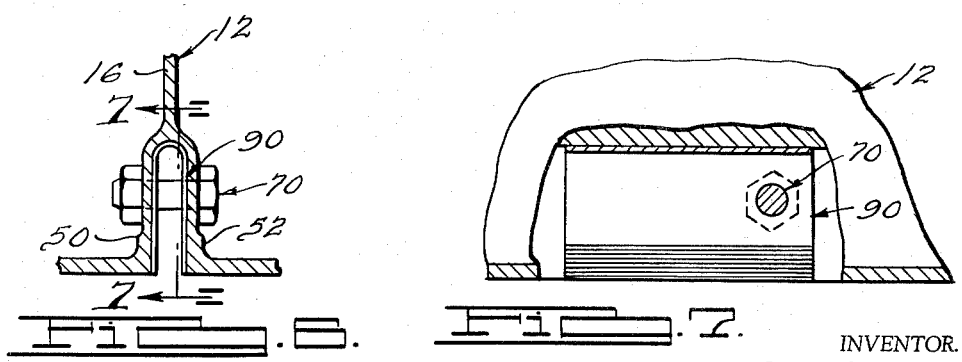
FIGURE 6 is a fragmentary cross sectional view similar to FIGURE 2 showing the orientation of a resilient hook retaining shim.
FIGURE 7 is a cross sectional view taken substantially along the line 7—7 of FIGURE 6.

As best seen in FIGURE 6 of the drawings, a stainless steel shim 90 of generally U-shaped vertical cross section is disposed between the leg portions 50 and 52 of the web 16 of the cross beam 12 to augment the self-stabilizing feature of the hook 10 in the stowed condition as well as to preclude galling between the hook 10 and the cross beam 12.

From the foregoing description, it should be apparent that the improved retractable meat hook of the instant invention is relatively easily moved between a downwardly depending operative condition and a generally horizontal still condition. When in the stowed condition the hook 10 allows maximum utilization of the cube of the vehicle. The hook 10 is retained in the stowed condition both by its own weight and by a simple but effective resilient detent.

It is to be understod that the specific construction of the improved meat hook herein disclosed and described is presented for the purpose of explanation and illustration and is not intended to indicate limits of the invention, the scope of which is defined by the following claims.

What is claimed is:

1. A retractable hook for suspending loads from the roof of trucks, trailers and the like comprising,
   a hook support beam,
   a horizontally extending hook support pin supported by said beam, and
   a folding hook supported by said pin and so as to be movable between a downwardly depending operative condition and a generally horizontal storage condition, said hook having
   a shank portion with
   a reentrantly folded portion at one end thereof extending in spaced relation to the shank portion so as to define a relatively long slot for the acceptance of said pin,
   said hook having a load accepting loop at the other end of the shank portion thereof extending a plane generally normal to a plane defined by said shank and reentrant portions,
   said hook being movable substantially 90° in the plane defined by the shank and reentrant portion thereof between a downwardly depending condition with said pin at one end of said slot and a storage condition with said pin at the other end of said slot and said load accepting loop in a generally horizontal condition.

2. A retractable hook for suspending loads from the roof of trucks, trailers and the like comprising,
   a hook support beam having a pair of parallel vertically extending horizontally spaced pin support legs,
   a hook support pin extending horizontally between said legs and generally normal thereto, and
   a folding hook supported by said pin and so as to be movable between a downwardly depending operative condition and a generally horizonal storage condition, said hook having
   a shank portion wtih a reentrantly folded portion at one end thereof, the reentrant portion of said hook extending in spaced relation to the shank portion thereof so as to define a relatively long slot for the acceptance of said pin,
   said hook having a load accepting loop at the other end of the shank portion thereof extending a plane generally normal to a plane defined by said shank and reentrant portions,
   said hook being movable substantially 90° between a downwardly depending condition with said pin at one end of said slot nad a storage condition with said pin at the other end of said slot and said load accepting loop in a generally horizontal condition.

3. A retractable hook for suspending loads from the roof of trucks, trailers and the like comprising,
   a hook support beam having a pair of parallel vertically extending horizontally spaced pin support legs,
   a hook support pin extending horizontally between said legs and generally normal thereto, and
   a folding hook supported by said pin and so as to be movable between a downwardly depending operative condition and a generally horizontal storage condition, said hook having
   a shank portion with a reentrantly folded portion at one end thereof, the reentrant portion of said hook extending in spaced relation to the shank portion and terminating at an intermediate portion thereof so as to define a closed relatively long slot for the acceptance of said pin,
   said hook having a closed load accepting loop at the other end of the shank portion thereof extending in a plane generally normal to a plane defined by said shank and reentrant portions,
   said hook being movable substantially 90° in a plane normal to the axis of said pin between a downwardly depending condition with said pin at said one end of said slot and a storage condition with said pin at the intermediate portion of said shank and said load accepting loop in a generally horizontal condition.

4. A retractable hook for suspending loads from the roof of trucks, trailers and the like comprising,
   a hook support beam having a pair of parallel vertically extending horizontally spaced pin support legs,
   a hook support pin extending horizontally between said legs and generally normal thereto,
   a folding hook supported by said pin and so as to be movable between a downwardly depending operative condition and a generally horizontal storage condition, said hook having
   a shank portion with a reentrantly folded portion at one end thereof, the reentrant portion of said hook extending in spaced relation to the shank portion and terminating at an intermediate portion thereof so as to define a closed relatively long slot for the acceptance of said pin,
   said hook having a closed load accepting loop at the other end of the shank portion thereof extending in a plane generally normal to a plane defined by said shank and reentrant portions,
   said hook being rotatable substantially 90° in a plane normal to the axis of said pin between a downwardly depending condition with said pin at said one end of said slot and a storage condition with said pin at the intermediate portion of said shank and said load accepting loop in a generally horizontal condition against said support beam whereby further rotation of said hook is precluded, and
   means on said support beam resiliently engageable with said hook to retain it in the storage condition.

References Cited by the Examiner

UNITED STATES PATENTS

| | | | |
|---|---|---|---|
| 1,464,160 | 8/23 | Weyel | 248—340 |
| 1,491,122 | 4/24 | Wallace | 248—308 |
| 1,719,380 | 7/29 | Newman | 248—308 |
| 2,193,699 | 3/40 | Sadler | 248—307 |
| 2,809,069 | 10/57 | Neel | 17—44.2 |
| 2,904,300 | 9/59 | Kirk | 248—340 |
| 2,958,498 | 11/60 | Richter | 248—340 |
| 2,959,389 | 11/60 | Richter et al. | 248—340 |
| 3,043,550 | 7/62 | Garbarino et al. | 248—361 |

CLAUDE A. LE ROY, *Primary Examiner.*